No. 650,925. Patented June 5, 1900.
M. BRUNER.
COMBINED CORN HARVESTER AND FARM WAGON.
(Application filed Mar. 16, 1900.)
(No Model.) 6 Sheets—Sheet 3.
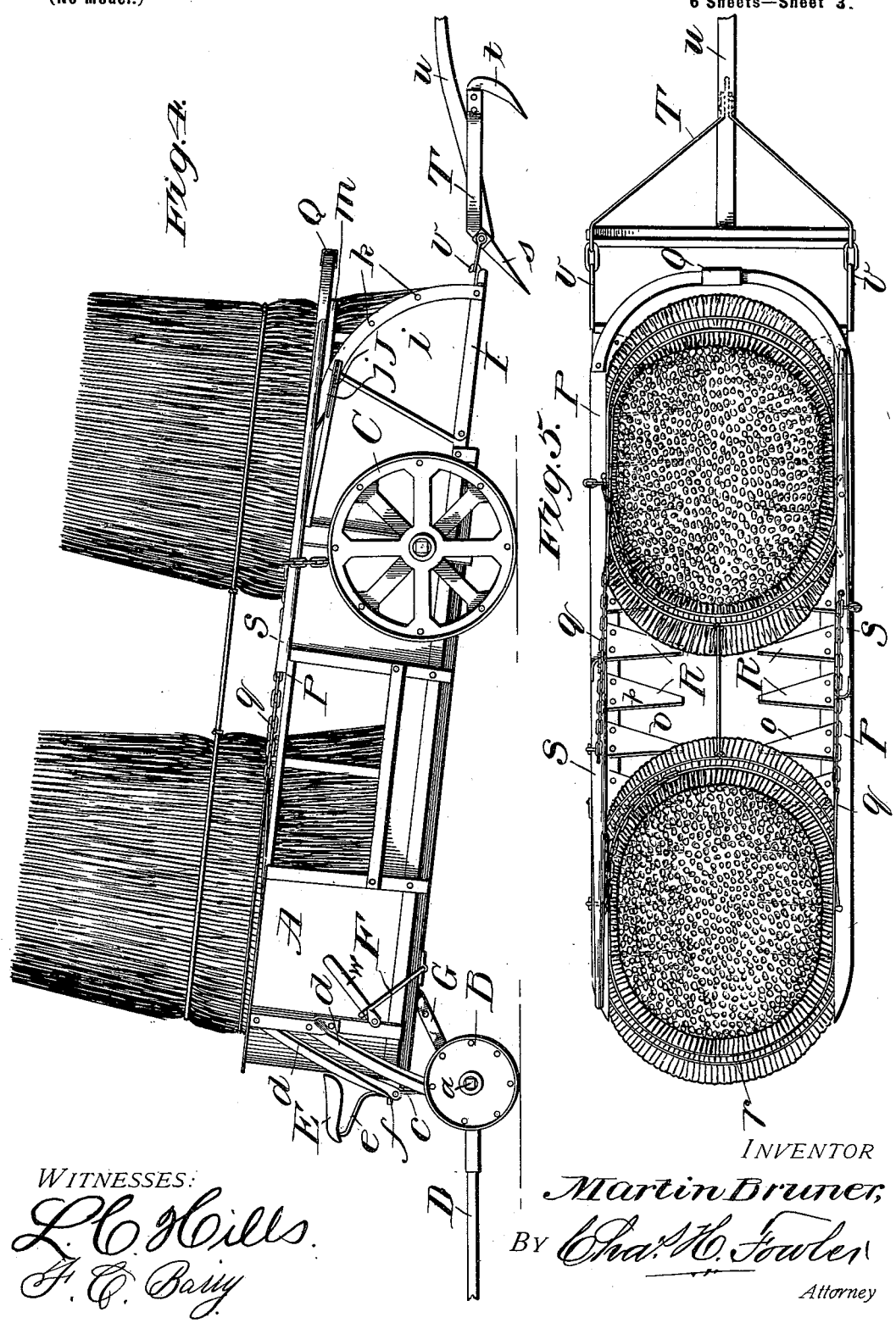
WITNESSES:
L. C. Hills.
F. C. Baiiy.
INVENTOR
Martin Bruner,
BY Chas. H. Fowler
Attorney No. 650,925. Patented June 5, 1900.
M. BRUNER.
COMBINED CORN HARVESTER AND FARM WAGON.
(Application filed Mar. 16, 1900.)
(No Model.) 6 Sheets—Sheet 4.
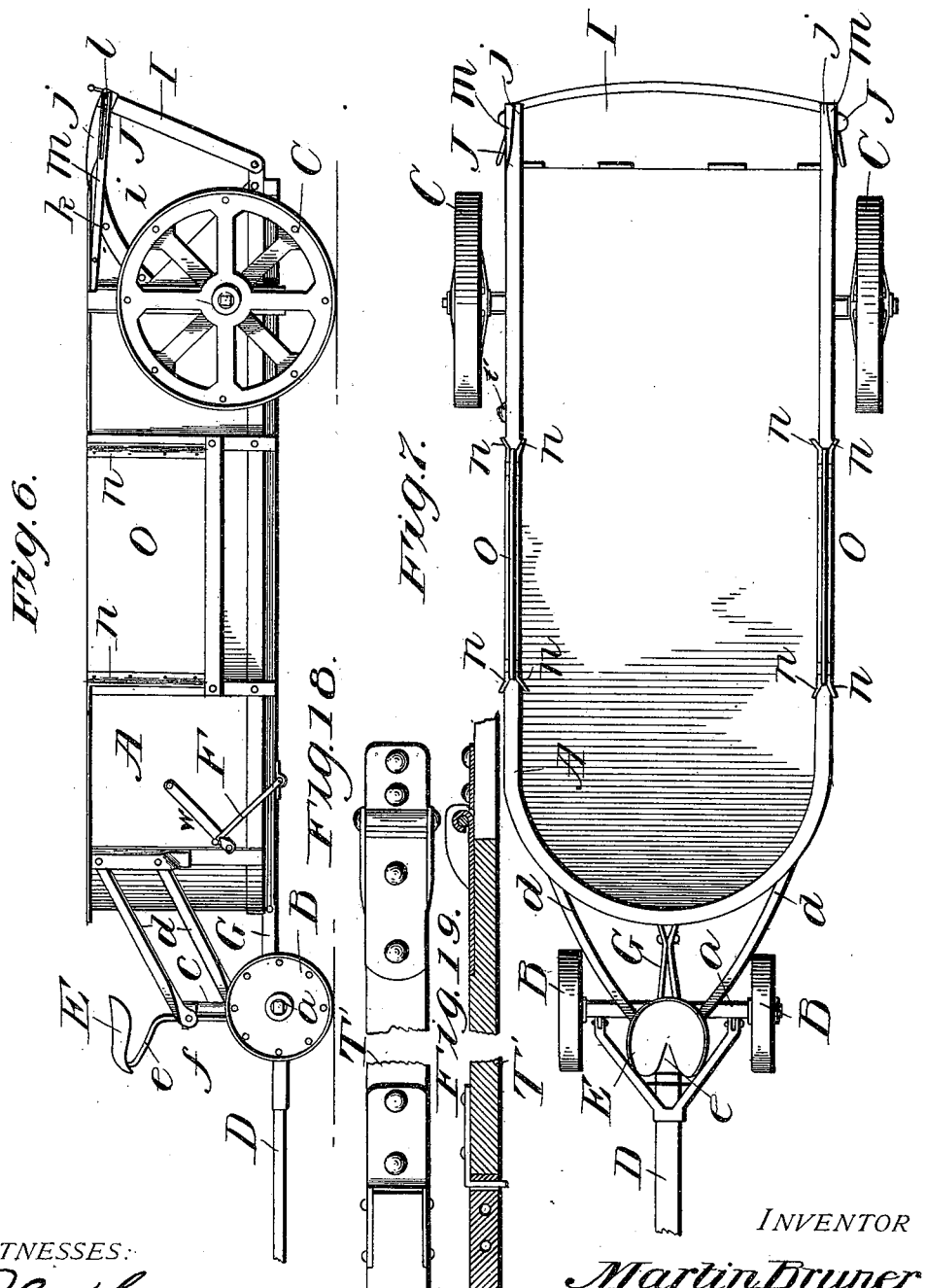
WITNESSES:
L. C. Hills
H. C. Barry
INVENTOR
Martin Bruner
BY Chas. H. Fowler
Attorney

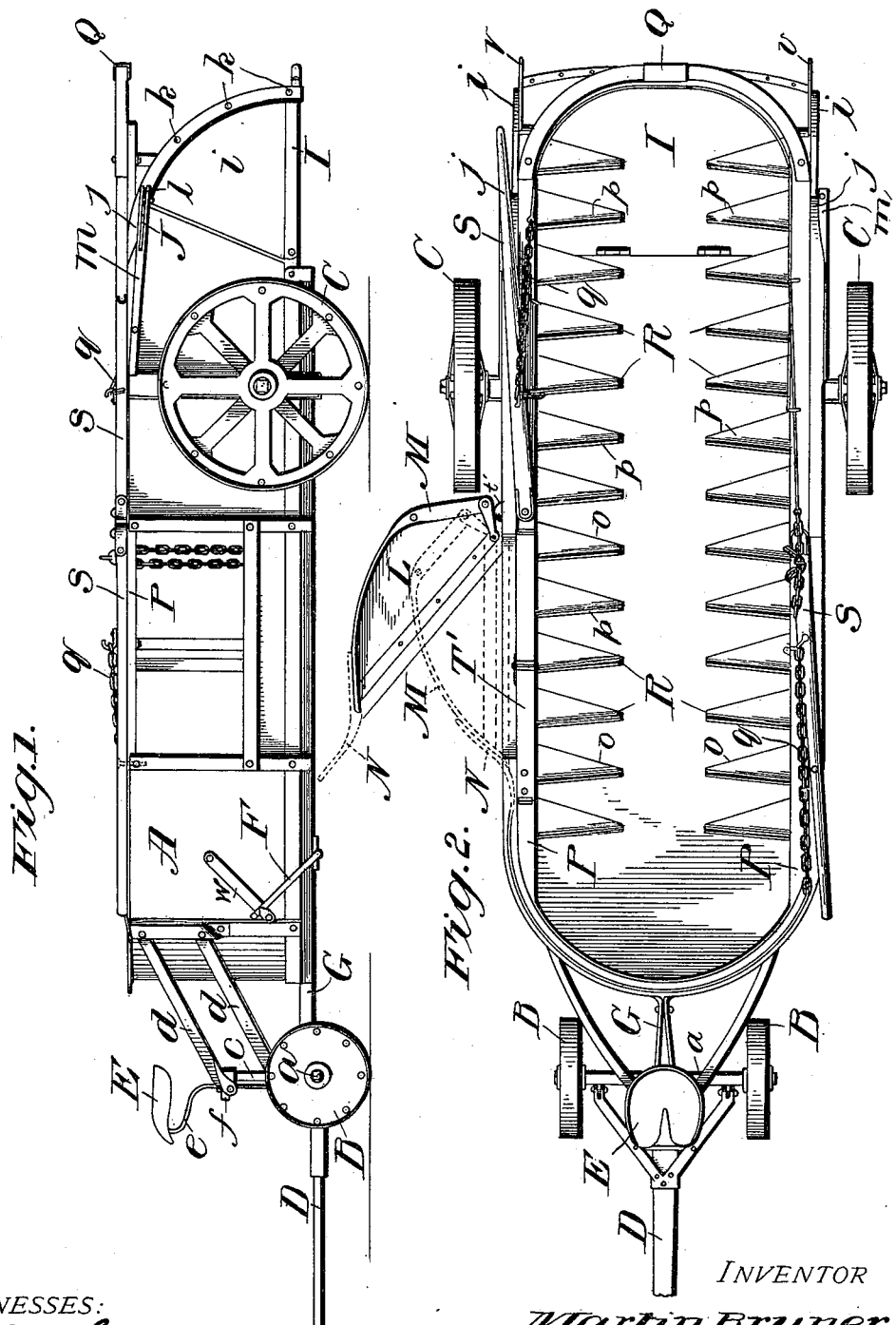

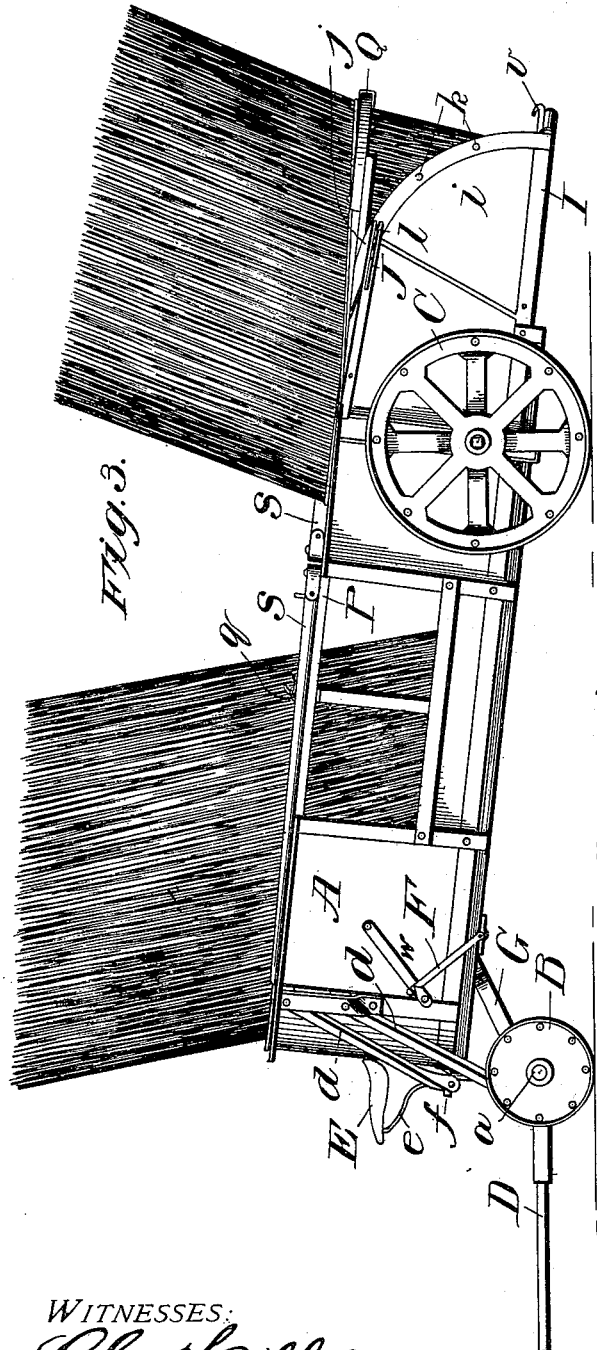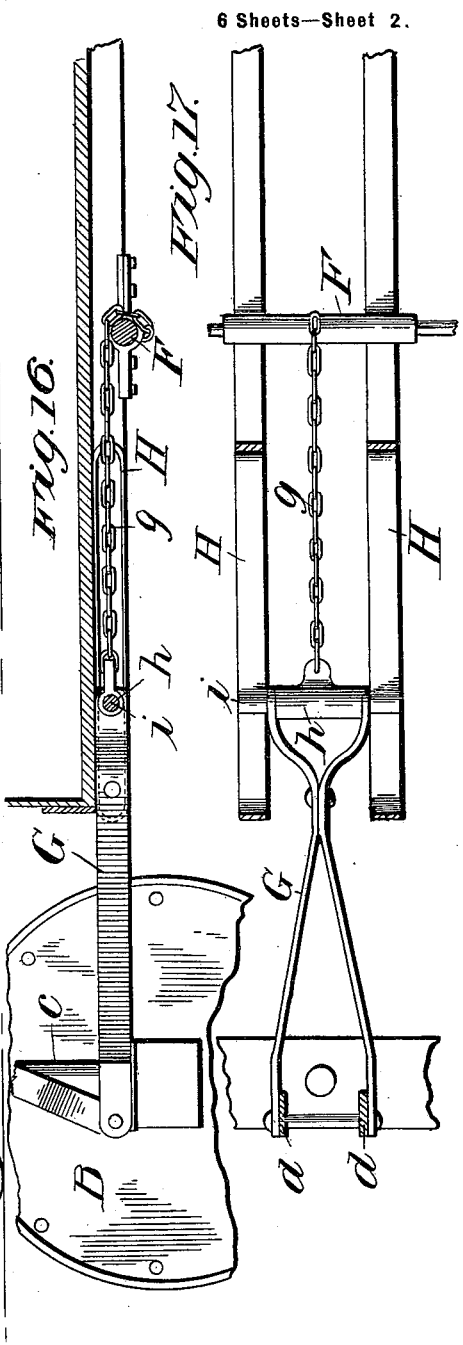

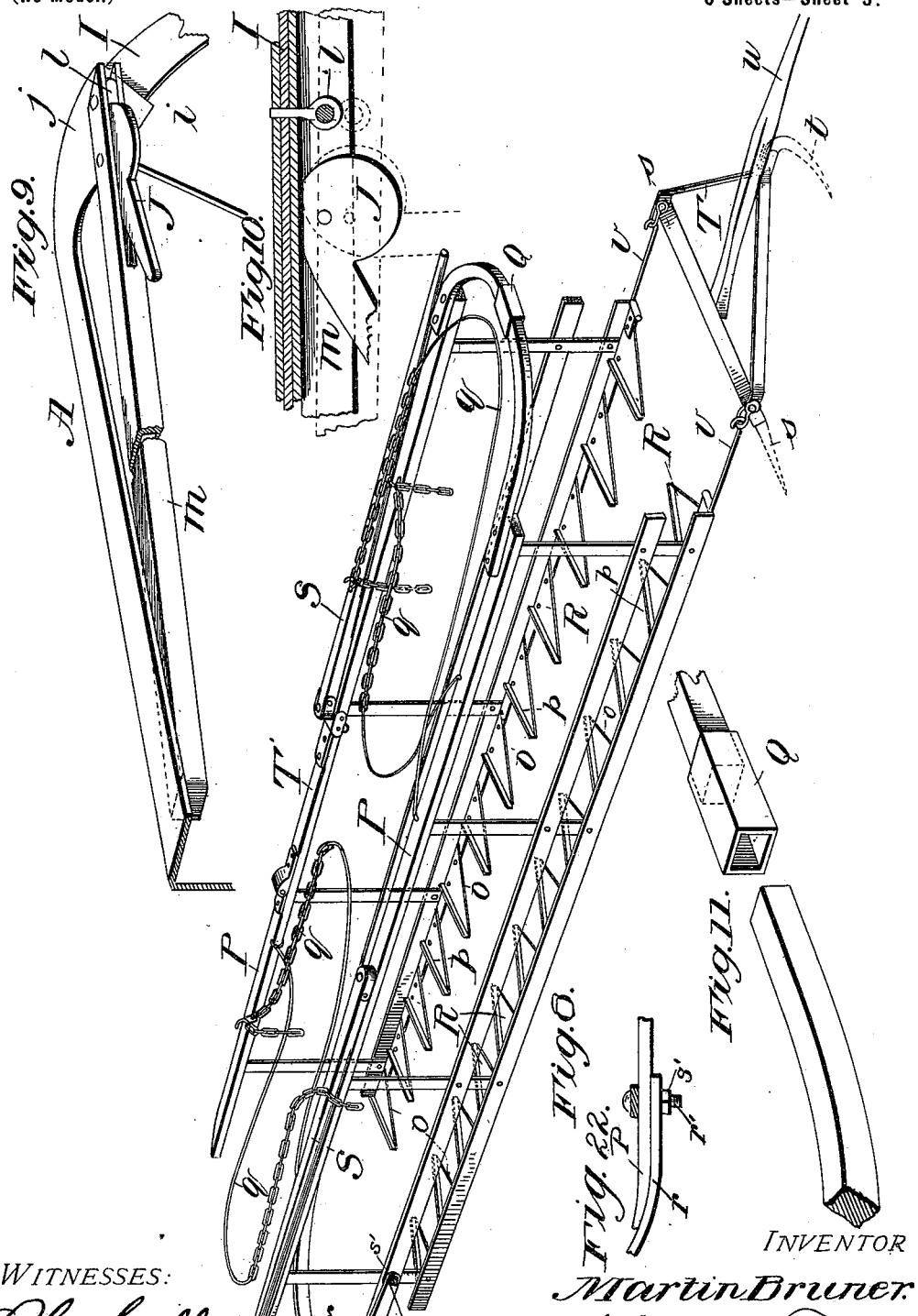

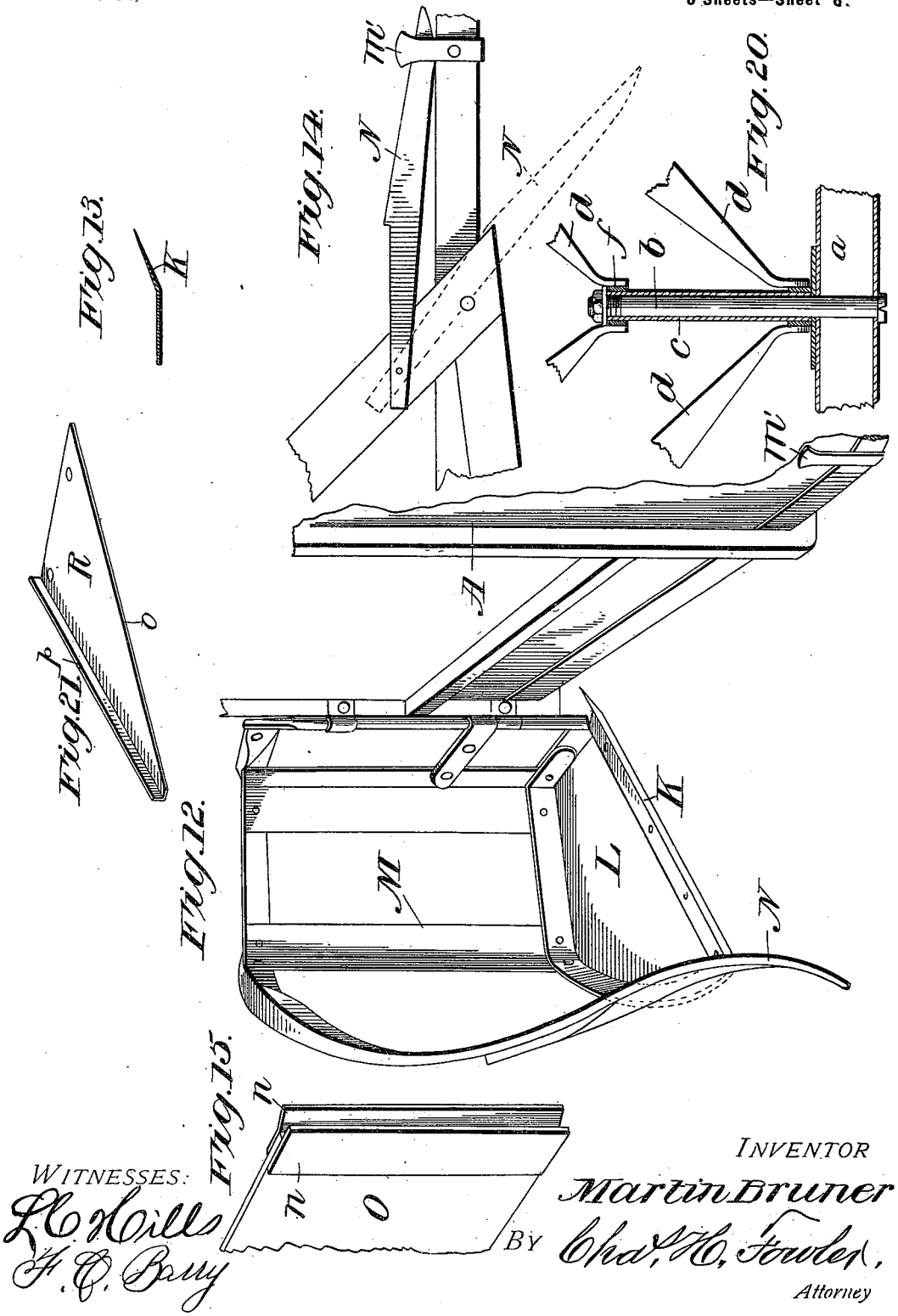

UNITED STATES PATENT OFFICE.

MARTIN BRUNER, OF BUCKLAND, OHIO.

COMBINED CORN-HARVESTER AND FARM-WAGON.

SPECIFICATION forming part of Letters Patent No. 650,925, dated June 5, 1900.

Application filed March 16, 1900. Serial No. 8,887. (No model.)

*To all whom it may concern:*

Be it known that I, MARTIN BRUNER, a citizen of the United States, residing at Buckland, in the county of Auglaize and State of Ohio, have invented certain new and useful Improvements in a Combined Corn-Harvester and Farm-Wagon; and I do hereby declare that the following is a full, clear, and exact description of the same, reference being had to the annexed drawings, making a part of this specification, and to the letters of reference marked thereon.

The present invention has relation to that class of agricultural machines especially adapted for harvesting corn for which a patent was granted to me the 31st day of January, 1899, and numbered 618,493; and the present invention is designed as an improvement thereon whereby greater efficiency is obtained and a more practically constructed machine is provided for cutting the corn in the field and receiving the stalks or shocks in the wagon to which the harvester is connected.

It is also a purpose of the invention to provide the wagon-body with means whereby it may be utilized as an ordinary farm-wagon when not required for use in connection with the corn-harvesting mechanism, thereby materially enhancing the value of the machine as a general farm adjunct with comparatively-little additional expense.

The invention therefore consists in a corn-harvester constructed substantially as shown in the drawings and hereinafter described and claimed.

Figure 1 of the drawings is a side elevation of the machine ready for use as a corn-harvester; Fig. 2, a plan view thereof; Fig. 3, a side elevation of the wagon, showing it in a tilted position with the shocks therein and before being tied; Fig. 4, a similar view showing the shocks after being tied and the anchor in position; Fig. 5, a top plan view of the shocking-frame with the shocks in position therein; Fig. 6, a side elevation of the machine when in use as a general farm-wagon; Fig. 7, a top plan view of the same; Fig. 8, a perspective view of certain parts of the machine for use as a corn-harvester; Fig. 9, a detail view in perspective and on an enlarged scale, showing a portion of the wagon-body and the gate-locking mechanism; Fig. 10, a horizontal detail view, partly in section; Fig. 11, an enlarged detail perspective view of the coupling for connecting the ends of the segmental bars at the rear end of the machine; Fig. 12, an enlarged detail view in perspective of the swinging cutter and its connections; Fig. 13, an enlarged sectional view through the blade of the cutter; Fig. 14, an enlarged detail view showing the means employed for locking the swinging cutter in a closed position against the side of the wagon; Fig. 15, a detail view, on an enlarged scale, showing one end of one of the side gates of the wagon-body; Fig. 16, a detail view, on an enlarged scale and partly in section, of the tilting mechanism for the wagon-body; Fig. 17, a top plan view of the same; Fig. 18, a top plan view, on an enlarged scale, of a portion of the gate; Fig. 19, a horizontal sectional view thereof; Fig. 20, a detail view showing the manner of connecting the axle to the front end of the wagon-body; Fig. 21, a detail perspective view of one of the finger-plates. Fig. 22 is a detail enlarged view showing the means employed for detachably connecting the strap to the shocking-frame.

In the accompanying drawings, A represents the body of the wagon, adapted to receive the cornstalks or shocks and provided with suitable wheels B C and the usual tongue D. The axle $a$ of the wheels B at the front of the wagon-body is connected to a king-bolt $b$, which king-bolt turns with the axle in a suitable sleeve $c$, supported by suitable braces $d$, pivoted to the front end of the wagon-body, as shown in Figs. 1, 6, and 20 of the drawings. A suitable seat E has a spring-support $e$ connected thereto, the lower end of said support engaging a suitable bracket $f$ and may be readily removed therefrom and suitably connected to any part of the wagon-body when in use as a farm-wagon.

The means above described for connecting the axle $a$ with the front end of the wagon-body enables the same to be raised or lowered as circumstances require.

The means employed for raising or lowering the wagon-body, or, in other words, tilting it, consists of a suitable crank F, connecting with a draw-bar frame G by means of a cord or chain $g$ and through the medium of a sleeve $h$, through which extends a short rod $i$, which engages at its end the grooved guides H. These grooved guides H, as shown in detail in Figs. 16 and 17 of the drawings, are secured to the under side of the wagon-body and form bearings for the crank F.

The draw-bar G, which may be of any suitable form and construction, forms a brace to the wagon-body when in a tilted position, as shown in Fig. 3 of the drawings. This tilting of the wagon-body enables the shocks or cornstalks therein to be more readily removed without pulling them out of shape or otherwise disarranging them. In winding up the chain g upon the crank F the draw-bar frame G being drawn in the direction of the crank will cause the wagon-body to be raised at its front end and depressed at its rear end, as shown in Fig. 3 of the drawings. The braces d being pivoted at their ends serve not only as braces but hangers for the front end of the wagon-body, and the means herein employed for connecting the tongue D to the wagon-body and the means for operating or tilting it form together one of the essential features of the invention when applied to a corn-harvester.

The wagon-body A is provided with a hinged end-gate I of any preferred construction, having the segmental side wings i, which engage at their edges with the grooved guides j at the rear end and sides of the wagon-body. At or near the edge of the segmental side wings i are a plurality of bolt-holes k, with which engages the bolt l to hold the gate I either closed or open at any desired angle required. The bolt l is loosely connected to the end of a pivoted arm m, which arm is operated by an eccentric lever J, pivoted to the arm, as shown in Figs. 9 and 10 of the drawings. It will be understood that this arm at its outer or free end is forced in or out, as the case may be, and the bolt l being on this arm will be carried with it.

A swinging cutting device is suitably hinged to one side of the wagon-body A, so that it may be conveniently removed when the body is in use as a farm-wagon. This cutting device is shown in detail in Fig. 12 of the drawings and the cutting-blade K in section in Fig. 13 of the drawings. The cutting-blade K is secured to a horizontal platform L, upon which platform the person stands to receive the cornstalks or shocks as they are cut by the blade K and deliver them to the man in the wagon. The platform L is connected to a suitable frame M, and to this frame is pivoted a curved gatherer N, which is brought against the stalks or hill of corn and crowds the stalks together, thereby straightening up the stalks for the blade K to cut when brought in contact therewith. It also forms an additional service in acting as a latch by engaging with a keeper m upon the side of the wagon-body A, thereby holding the cutting device closed against the side of the body when not in use and out of the way.

When the wagon-body A is desired for use as a farm-wagon, the cutting device (shown in Fig. 12 of the drawings) is detached and removed and the openings in the sides of the body closed by sliding doors O, as shown in Fig. 7 of the drawings. These doors may be of any suitable construction, and in Fig. 15 of the drawings is shown one of many forms that may be used, the same having plates n to engage the edges of the side walls of the openings. Any suitable and well-known construction of door may be substituted, so long as it is capable of being readily removed when required.

The cutting-blade K is at an obtuse angle to the plane of the platform L. This angle of the blade turning upward, as shown in Fig. 13 of the drawings, enables the blade to give a slanting cut, thereby materially facilitating the cutting of the stalk or shock. This feature in the form of the cutting-blade is considered of importance in securing a rapid and easy cutting action of the blade when brought in contact with the cornstalk or shock.

When the machine is in use as a corn-harvester, a suitable shocking-frame is placed in the wagon-body A, as shown in Figs. 2, 5, and 8 of the drawings. This frame is constructed of two detachable sections P, held together when in use by a suitable coupling-brace Q of any well-known form found best adapted to the purpose. This sectional shocking-frame may be of any desirable construction found most convenient and practical for holding the shocks. The shocking-frame sections P are provided with horizontally-extending flanged finger-plates R, constructed of metal and inclined upon one of their edges, as shown at o, the upwardly-extending flange p being on the opposite edge of the finger-plate. The flange upon the finger-plate prevents the stalks of the shock from slipping backward when pulling out the frame with the shocks to deposit the shock on the ground. The inclined edge of the finger-plate enables said plates to be withdrawn from under the shock with more ease and facility after the shocks have been deposited upon the ground. The detachable sections P of the shocking-frame are each provided with a lever S, pivoted thereto at one extremity of the lever, as shown in Fig. 8 of the drawings, the levers being upon opposite sides of the frame and upon opposite ends thereof when the two sections are together. Suitable flexible binding connections, as shown at q, are connected at one end to the lever and the opposite end to the opposite shocking-frame section, as shown in Fig. 8 of the drawings. These flexible connections may be a chain, cord, or wire, as found most desirable, and their purpose is to encircle the shocks in the wagon-body and bind the stalks together when the frame, with the shocks, is to be removed from the wagon-body and until the shocks are permanently bound with a suitable wire or cord in the usual manner. If desired, a suitable strap r, of metal or other desirable material, may be used to temporarily connect the shocking-frame sections P together at the ends opposite to those with the coupling-brace Q. The means which is preferably employed for rendering the strap $r$ detachable from the shocking-frame consists of the screw-threaded bolt $r'$, loosely passing through holes in the strap and shocking-frame, and the nut $s'$, engaging the screw-threaded end of the bolt, as shown in Fig. 22 of the drawings. As shown in Fig. 2 of the drawings, the cutting device is prevented from swinging back against the wheel by means of a suitable stop $t'$, or any other suitable and well-known means may be employed for this purpose.

I do not wish to be confined to any particular means of detachably connecting two shocking-frame sections together while they are in use, and any suitable and well-known means may be employed and the frame-sections variously modified or changed in their form and construction without departing from the principle of the invention.

At the rear end of the sectional shocking-frame and when the wagon-body is lowered to the position shown in Fig. 4 of the drawings is detachably connected a suitable anchor comprising a frame T, with the anchor-points $s\ t$ and handle $u$ for operating it.

When the machine is to be used as a corn-harvester, the sliding doors O are removed from the sides of the wagon-body and the cutting device (shown in Fig. 12 of the drawings) secured in place, as indicated in Fig. 2 of the drawings, and the end-gate I lowered to position. The shocking-frame consists of the two sections P, which are now placed in the body of the wagon and temporarily connected together by the coupling-brace Q. The wagon-body, with its attachments, is now ready for use as a corn-harvester, the position of the parts being shown in Fig. 2 of the drawings. The person standing on the platform L of the cutting device (shown in Fig. 12 of the drawings) receives the stalks as they are cut by the cutting-blade K. A second person in the body of the wagon receives the stalks from the one on the platform L and arranges them in shocks in the shocking-frame. The wires or flexible connections $q$ are temporarily used to hold the shocks in an upright position while being completed, after which the flexible connections are placed around the body of the shocks and tightened by the levers S. The stalks of the shocks are now tightly compressed together by the tension of the flexible connections above referred to and after being permanently tied are ready to be removed from the wagon-body. The shocks being supported in the shocking-frame by the finger-plates R, which form a skeleton bottom to the frame, the anchor, as shown in Fig. 8 of the drawings, is now connected to the hooks $v$ upon the ends of the shocking-frame sections P and the anchor-points $s\ t$ pressed into the ground. The shocking-frame being now anchored to the ground, the wagon-body is driven out from under it, thus leaving the shocking-frame, with the shocks, upon the ground. The sections P of the shocking-frame are uncoupled or disconnected and drawn out laterally from under the shocks, leaving the shocks deposited upon the ground and the shocking-frame placed back into the wagon-body. One of the frame-sections P is provided with a hinged gate-bar T' directly opposite the cutting device to facilitate passing the stalks as they are cut to the person in the wagon-body, the gate-bar being raised for this purpose, and thereby provide an unobstructed opening through the side of the wagon-body.

Any suitably-constructed anchor may be substituted for that shown to anchor the shocking-frame to the ground while the wagon-body is moved out from underneath the same.

The parts may be constructed of any suitable material found best adapted to the purpose and the wagon-body may be constructed of metal, if found desirable.

The means employed for tilting the wagon-body, the general construction of the wagon-body, the cutting device, and also the shocking-frame may be variously modified in the several details of construction without departing from the essential features of the invention.

The construction of the finger-plates R is an important element of the shocking-frame and may be constructed separately and afterward attached in any suitable and well-known manner to the shocking-frame sections P or may be formed together from a rectangular piece of sheet metal and afterward secured to the frame.

Having now fully described my invention, what I claim as new, and desire to secure by Letters Patent, is—

1. A corn-harvester comprising a suitable tilting wagon-body having a hinged end-gate, a swinging cutting device detachably connected to the side of the body and provided with a suitable platform, and a shocking-frame consisting of two detachable sections, and an anchoring device for anchoring the frame to the ground in removing the shocks from the wagon, substantially as and for the purpose set forth.

2. A corn-harvester and wagon combined, consisting of a suitable wagon-body, a swinging cutting device detachably connected thereto, and a shocking-frame removably supported in the wagon-body and provided with a plurality of finger-plates extending horizontally therefrom, said plates being inclined on one edge and flanged upon the other, substantially as and for the purpose described.

3. A corn-harvester consisting of a suitable wagon-body, suitable means for tilting said body, a swinging cutting device having a pivoted gatherer for the cornstalks detachably connected to the side of the wagon-body, and a shocking-frame comprising two detachable sections, each section having a plurality of finger-plates, substantially as and for the purpose specified.

4. A corn-harvester, consisting of a suitable wagon-body, a swinging cutting device connected to the side thereof, and a shocking-frame removably supported in the body, said frame comprising two detachable sections having pivoted levers and binding flexible connections, and a plurality of flanged finger-plates, substantially as and for the purpose set forth.

5. A corn-harvester, consisting of a suitable wagon-body, a swinging cutting device provided with a platform, a shocking-frame removably supported in the wagon-body, and means for tilting the body, comprising a suitable crank, a draw-bar, a flexible connection between the draw-bar and crank, grooved guide-bars for the end of the draw-bar, and the forward axle pivotally connected to the draw-bar and to pivoted braces upon the end of the wagon-body, substantially as and for the purpose set forth.

6. A corn-harvester comprising a tilting wagon-body, a shocking-frame comprising two detachable sections having pivoted levers and binding connections, and inwardly-extending horizontal finger-plates having inclined and flanged edges upon the opposite sides thereof, and a suitable anchor adapted for attachment to the shocking-frame, and a cutting device hinged to the sides of the wagon-body and provided with a platform and cutting-blade at an obtuse angle thereto, substantially as and for the purpose set forth.

7. In a corn-harvester, a suitable wagon-body, and a shocking-frame supported therein, said frame constructed of two detachable sections, and a three-pointed anchoring device detachably connected to the shocking-frame, substantially as and for the purpose described.

In testimony that I claim the above I have hereunto subscribed my name in the presence of two witnesses.

MARTIN BRUNER.

Witnesses:
P. J. WALSHE,
F. C. BARRY.